May 8, 1934.  J. M. HUTCHINSON  1,958,144
MACHINE FOR MAKING STICK CANDY
Filed Oct. 19, 1932  4 Sheets-Sheet 1
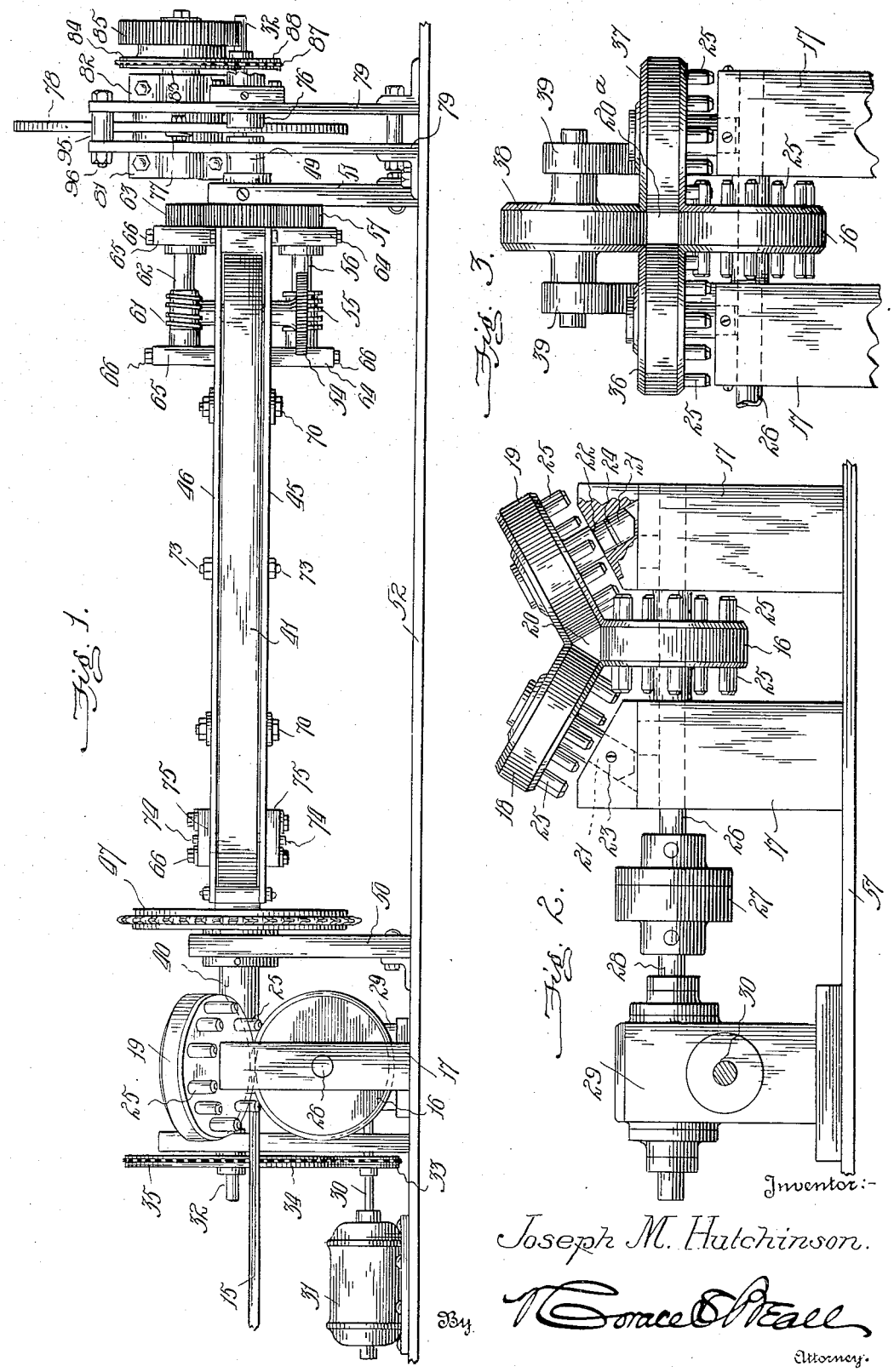
Inventor:-
Joseph M. Hutchinson.
By Horace O'Neall
Attorney.

May 8, 1934.  J. M. HUTCHINSON  1,958,144
MACHINE FOR MAKING STICK CANDY
Filed Oct. 19, 1932  4 Sheets-Sheet 2
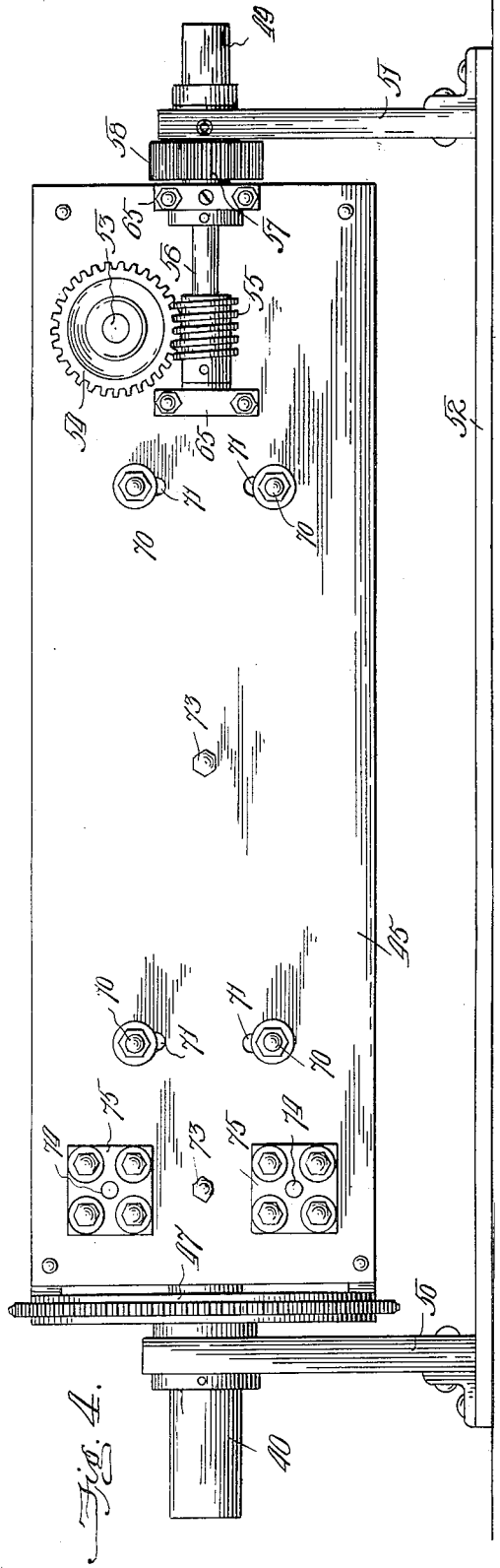
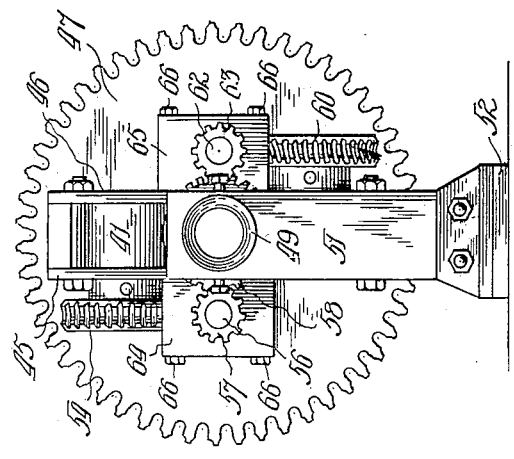
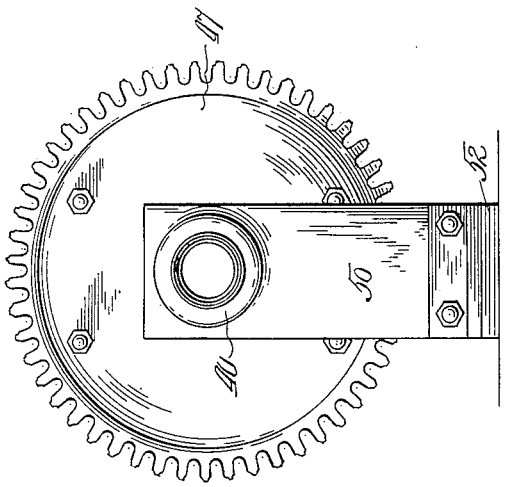
Inventor:-
Joseph M. Hutchinson.
By
Attorney.

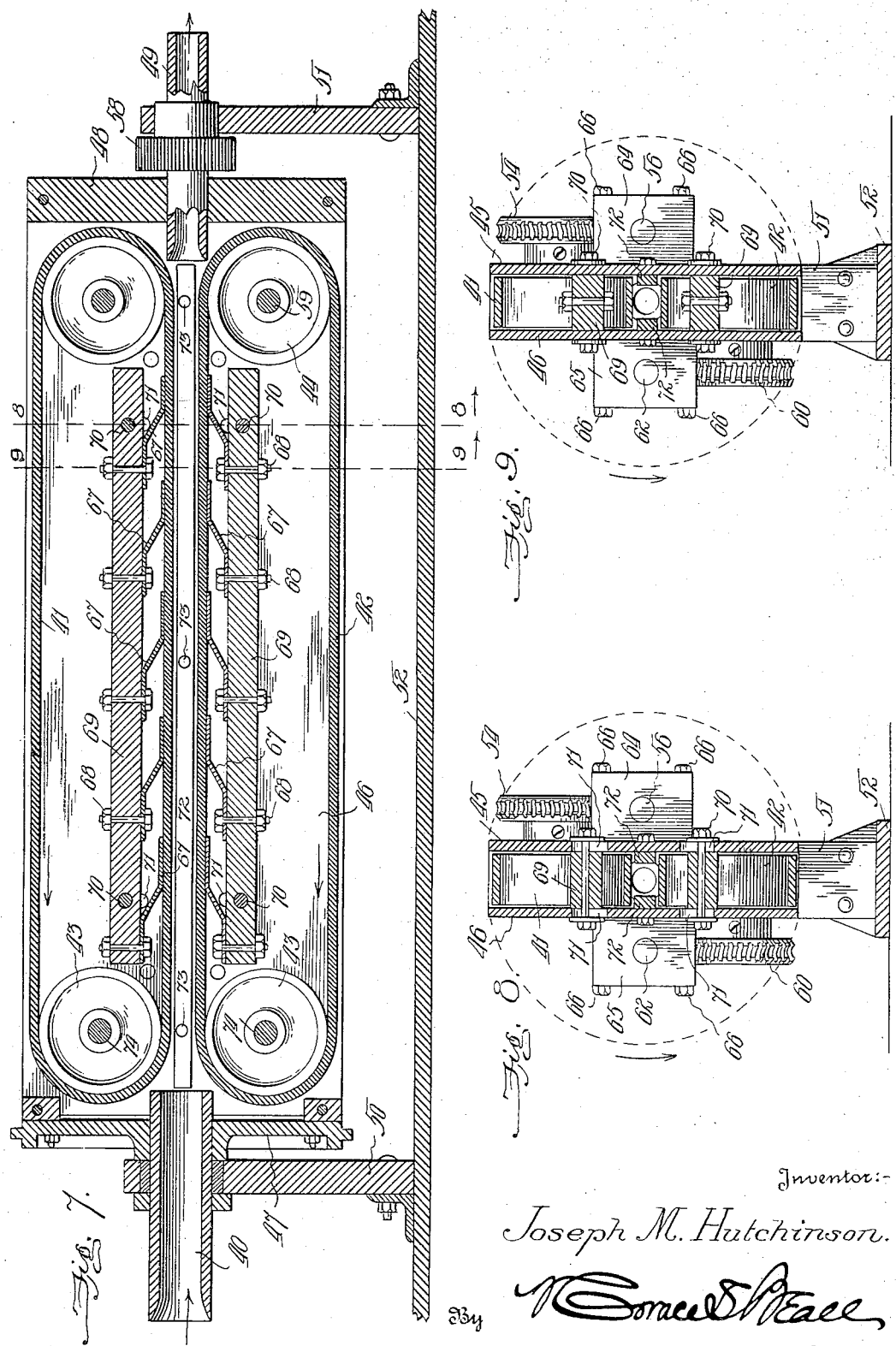

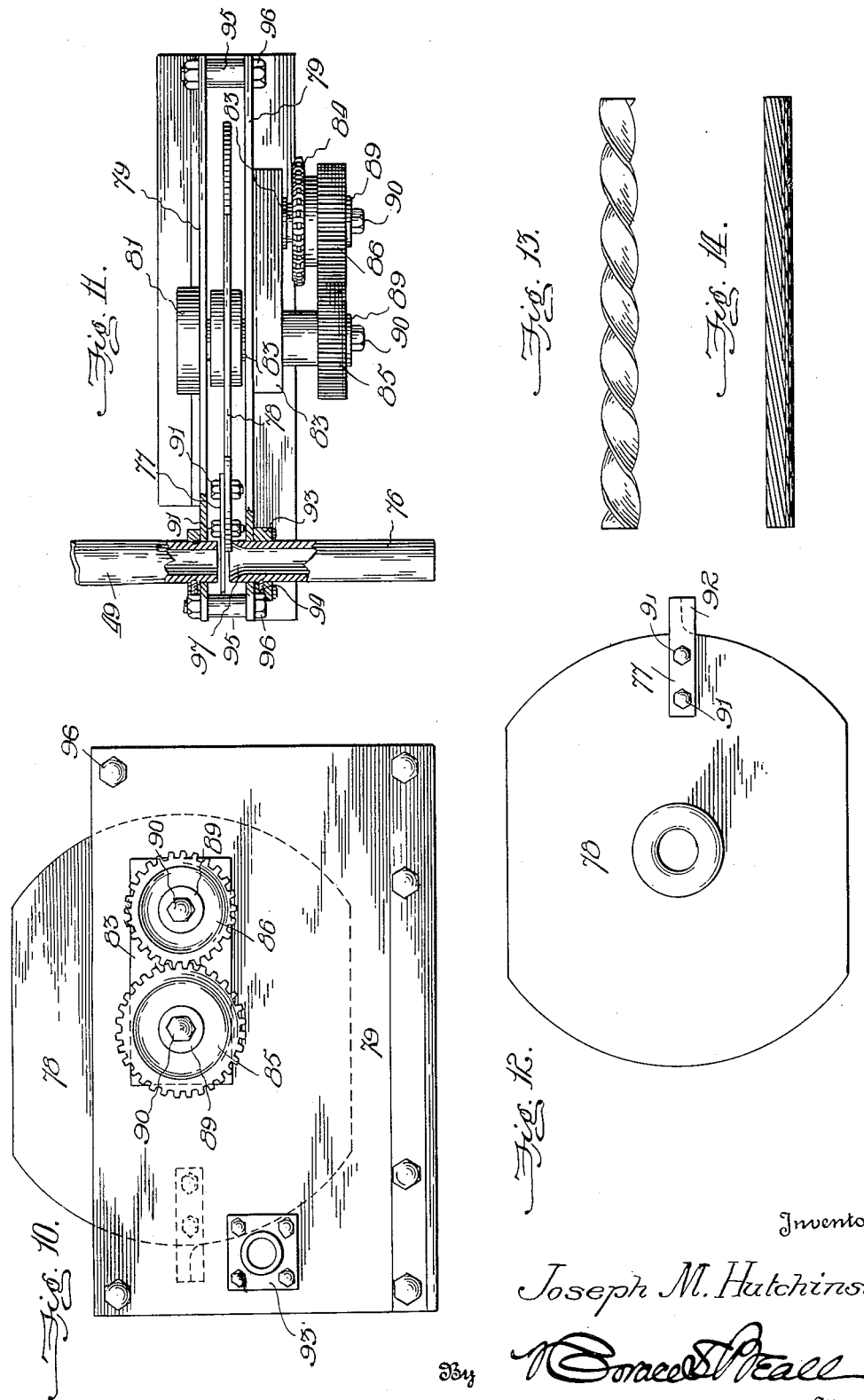

Patented May 8, 1934

1,958,144

UNITED STATES PATENT OFFICE 1,958,144

MACHINE FOR MAKING STICK CANDY

Joseph M. Hutchinson, Chicago, Ill., assignor to
Volquardt O. Hermann, New York, N. Y.

Application October 19, 1932, Serial No. 638,639

13 Claims. (Cl. 107—10)

My invention is an improvement in candy making machines, and relates to that special type adapted for the production of what is commonly termed spiral stick candy.

The main object of my invention is to provide a machine of this general character as a self-contained unit which will be simple in its operation to require the services of a single attendant, and by the progressive action of the cooperating mechanisms will form a continuous strip of the desired shape in cross-section which is twisted spirally and then cut into pieces or sticks of the desired length.

A further object of my invention is to produce a machine for making spiral stick candy that will be comparatively cheap in construction consistent with required durability and effectiveness, and in which the parts thereof are so arranged as to expedite the successive operations to thereby increase production or the capacity of the machine in use.

A still further object of my invention is to provide a machine of this type in which the strip of candy passing from the shaping or sizing rolls is firmly gripped during the twisting operation as well as during the subsequent cutting of the strip into predetermined lengths by the cutting mechanism.

These outstanding purposes and advantages of my invention are attained in the present instance by improved sizing, twisting, and cutting mechanisms constituting the machine and operating successively as the candy fed as usual from batch rolls or a flat board passes from the intake end of the machine to the other or discharge end thereof, as hereinafter fully described as to construction and operation and particularly claimed as to the novel features thereof.

In the drawings forming a part of this application,

Figure 1 is a side elevation of a machine for making spiral stick candy constructed in accordance with my invention showing the assembly of the sizing, twisting, and cutting mechanisms.

Fig. 2 is an enlarged view in front elevation of the mechanism for sizing or shaping the candy strip V-shape in cross-section.

Fig. 3 is a detail view showing a modification in the arrangement of sizing rolls to form a square strip.

Fig. 4 is an enlarged side elevation illustrating the twisting mechanism.

Figs. 5 and 6 are opposite end views of said twisting mechanism.

Fig. 7 is a longitudinal vertical section through the same.

Figs. 8 and 9 are vertical transverse sectional views on the lines 8—8 and 9—9 of Fig. 7.

Fig. 10 is a rear end view of the mechanism for cutting the sticks into lengths.

Fig. 11 is a top plan view thereof.

Fig. 12 is a detail view of the revolving disc carrying the cutting knife.

Fig. 13 is a view of a spiral candy stick formed by the machine, substantially triangular in cross section, and Fig. 14 is a view showing a spirally twisted candy stick round in cross section.

In carrying out my invention the candy is fed from the usual batch rolls (not shown) or by means of a flat plate 15 in between a set of sizing rolls to form the strip which is subsequently twisted by the machine in the production of the spiral candy stick. In the present instance I employ three or more sizing rolls disposed at an angle to each other so that the periphery of each sizing roll will form one side of the strip while the marginal edges of the several rolls are beveled to impinge one against the other to clearly define the cross-sectional shape of said strip. As illustrated in Fig. 2 one of the rolls, as driven roll 16, is disposed vertically between standards 17, 17, while the companion rolls 18 and 19 are arranged at opposite angles above so that the peripheries of the rolls conjointly form a triangular opening 20 by which the candy strip is shaped as it passes between said rolls, and the meeting edges of the rolls being beveled, as shown in the drawings, will give a well defined shape to said strip. The sizing rolls 18 and 19 are mounted upon the standards 17, 17 by stub shafts 21 enlarged at their inner end to provide a shoulder 22 bearing upon the upper inclined end of the standards respectively, and to maintain these rolls in intimate contact with the roll 16 set screws 23 are threaded through the upper portions of the standards to engage grooves 24 in the stub shafts. The several sizing rolls may be connected for rotation by beveled gear teeth but I prefer to employ intermeshing pins 25, and in order that the speed of rotation may be regulated with respect to the speed of the twisting mechanism hereinafter described the shaft 26 from roll 16 is connected by clutch 27 to the shaft 28 extending from a housing 29 enclosing an ordinary type of speed reducing gear connected by shaft 30 to an electric motor 31. The motor driven shaft is also connected to a shaft 32 for driving the other parts of the machine, the connection being preferably by means of a small sprocket wheel 33 on said shaft from which sprocket chain 34 passes to and around a large sprocket wheel 35 on shaft 32, which latter extends horizontally in the rear of the machine so as to operate the twisting and cutting mechanisms. In the modification of the sizing mechanism, as shown in Fig. 3, for the purpose of forming a rectangular or square opening 20a horizontally disposed rolls 36 and 37 are geared to driven roll 16 with an idle roll 38 opposing the roll 16 and journaled in the bearings 39, 39 extending from the uprights 17, it being noted that in this instance also the edges of the periphery of the rolls which abut one another are beveled for producing a well defined rectangular or square strip.

The candy strip shaped by the sizing rolls hereinbefore described passes through a tube 40 in which it is twisted spirally by means of two endless belts 41 and 42 between which said strip is firmly gripped as it is conveyed to the cutting mechanism hereinafter described, and to effect the twisting of the candy strip through the instrumentality of these belts they are bodily rotated laterally for which purpose the pairs of rollers 43 and 44 over which said belts pass are journaled between plates 45 and 46 connected at one end by sprocket wheel 47 rotatable on the tube 40 and at the other end by a spacing bar 48 rotatable on a tube 49 through which the spiral candy stick passes to the cutting mechanism, said plates and connecting means thereby constituting a supporting frame for the belts which can be rotated for twisting the candy strip. The tubes 40 and 49 which support this rotatable frame are mounted in the upper ends of standards 50, 51 rising from bed plate 52, and the frame is rotated by a sprocket chain connecting the sprocket wheel 47 to a sprocket wheel on the shaft 32 hereinbefore referred to as being driven by the motor. The shafts 74 supporting the rollers 43 are journaled at their ends in bearings 75 bolted at opposite sides of the rotatable frame carrying the endless belt, and for driving the endless belts shaft 53 of one of the rollers 44 is extended beyond one side of the supporting frame to receive a worm wheel 54 in mesh with a worm 55 on shaft 56 geared by pinion 57 to a gear wheel 58 fixed to the tube 49. In like manner shaft 59 of the other roller 44 which drives the companion belt is extended beyond the other side of the frame to receive worm wheel 60 in mesh with worm 61 on shaft 62 having a pinion 63 also meshing with the gearwheel 58 at the opposite side thereof from the pinion 57, the worm shafts being journaled at their ends in bearings 64, 64 and 65, 65 projecting from the plates of the rotatable frame and secured thereto by bolts 66. As indicated in Fig. 7 the inner stretches of these gripping and conveying belts travel in the same direction, that is toward the cutting mechanism.

The belts 41 and 42 are preferably made of rubber and in order to insure their contact with the spirally formed candy stick throughout the length of the adjoining stretches of said belts metal strips 67 press yieldingly against the inner side thereof, said strips being attached by bolts 68 to bars 69 secured between the plates 46 and 45 by bolts 70. As will be seen by reference to Fig. 7 the bars 69, 69 are each located within the endless belts between the rollers over which said belts pass with the metal strips bent at one end to engage their companion belt and at the other end for attachment to the supporting bars, and it will also be noted that the supporting bars are adjustable to increase or diminish the pressure of the guide strips by providing the plates of the supporting frame with slots 71 through which the bolts 70 pass. The spirally formed candy stick is further guided on its way to the cutting mechanism by means of metal bars 72, 72 secured by bolts 73 to the opposite plates of the rotatable frame and spaced apart between the adjoining longitudinal stretches of the endless belts, whereby the space between said bars and belts correspond approximately with the cross-sectional diameter of the candy strip or twisted candy stick.

The candy stick passes from between the belts through tube 49 to the mechanism for cutting the sticks into predetermined lengths, for which purpose the inner end of a discharge tube 76 is slightly spaced from the outer end of the aforesaid tube 49 whereby a knife blade 77 carried by a revolving disk 78 passes between said tubes for severing the candy stick. The revolving cutting disk is located between spaced apart plates 79, 79 rising from the bed plate 52 to which they are bolted, and the shaft 80 of said disk is journaled in bearing boxes 81, 81 secured to the outer sides of the supporting plates, the bearing box 82 being of sufficient length to form a bearing for a stub shaft 83 on which is fixed a sprocket wheel 84. Intermeshing gearwheels 85 on shaft 83 and 86 on shaft 80 operate to revolve the cutting disk from shaft 32 (Fig. 1) by a sprocket chain 87 passing from a sprocket wheel 88 on said shaft to the aforementioned sprocket wheel 84, and in order that the speed of rotation of the cutting disk may be varied to cut candy sticks of different lengths the gearwheels 85 and 86 are removable from the ends of shafts 80 and 83 for change of gear, being secured to said shafts by washers 89 and machine screws 90. For spacing the plates 79, 79 between which the cutting disk operates short tubes 95 are employed through which connecting bolts 96 pass. The knife blade 77 is secured to the margin of the disk by bolts 91 with the portion thereof having the cutting edge 92 extending beyond the disk, and for supporting the discharge tube 76 there is a bearing block 93 bolted to one of the supporting plates 79 with a set screw 94 extending through the block to engage the tube.

It will be noted by reference to Figs. 1 and 11 that the knife blade passes across the outer end of the tube 49 to effect a clean cut, and that the inner end of the bore through the discharge tube 76 is flared, as at 97, for guiding the spirally formed strip or stick into said discharge tube, the length of the severed stick being determined by the diameter of the disk and rate of revolution thereof with respect to the speed in delivering the stick from the endless belts 41 and 42 of the twisting mechanism to this cutting mechanism. In other words, by the employment of a cutting disk of wide diameter the continuously moving twisted strip of candy or confection will be given a quick or sharp cut at each revolution of said cutting disk, and the changeable gears will provide for increasing or decreasing the length of the severed stick as desired. Furthermore, it will be understood that the twisting of the candy strip takes place between the sizing rolls and belts carried by the rotatable frame, and that the ratio of operation of the sizing rolls and rotatable frame will determine the degree of twist imparted to said strip, in which operation the strip is held by the sizing rolls which shape the same and gripped between the moving belts, the length of the latter affording a firm grip on the strip for a considerable portion of its length maintained by the yielding presser strips 67.

In the operation of the machine the strip of candy from the batch rolls is fed to the sizing rolls from the plate 15, and from the latter passes through the tube 40 to the carrier belts 41 and 42, the bodily rotation of which around the axis of the tube serves to twist the strip and as the formed strip is conducted by the belts to the cutting mechanism the gripping action of said belts will insure a uniform twist. The spirally twisted strip of candy passes from the belts through the spaced apart tubes 49 and 76 between which the knife blade of the revolving cutting disk passes to sever the strip in producing the spirally twisted candy sticks such as illustrated in Figs. 13 and 14 which are discharged from the tube 76.

As hereinbefore mentioned the degree of twist can be varied by adjustments of the parts, and in addition to forming a spiral candy stick sizing rolls of a conventional design may be used to form a strip round in cross-section, and said strip twisted to produce candy sticks of different kinds.

Having described the construction and operation of my improved machine for making spirally twisted candy sticks I do not wish to limit my patent protection to what is exactly illustrated in the drawings, which are intended to show the preferred embodiment of my invention, it being understood that obvious modifications of changes are contemplated within the spirit and scope of the appended claims.

I claim:

1. A machine for making twisted stick candy comprising sizing rolls for imparting the required cross sectional shape and size to the strip of candy to be twisted, a pair of longitudinal belts the adjoining stretches of which are spaced apart to grip the formed strip of candy between them, and means for revolving said belts transversely for twisting the strip of candy between the belts and the sizing rolls.

2. A machine for making twisted stick candy comprising sizing rolls for imparting the required cross sectional shape and size to the strip of candy to be twisted, a pair of endless belts the adjoining stretches of which are spaced apart to receive and grip the candy strip between them, means for moving the belts for conveying the strip, and means for revolving said belts bodily around a common axis between the belts indicated by the continuous strip of candy passing between the same whereby said strip of candy is twisted intermediate the sizing rolls and belts.

3. A machine for making twisted stick candy comprising sizing rolls for imparting the required cross sectional shape and size to the strip of candy to be twisted, a pair of endless belts the adjoining stretches of which are spaced apart to receive and grip the candy strip between them, means for rotating said belts bodily around a common axis between the adjoining stretches thereof, said belts being of such length as to grip the candy strip for twisting the same intermediate the sizing rolls and belts, and means responsive to the bodily rotation of the belts for operating the latter to convey the twisted candy strip to the discharge end of the machine.

4. A machine for making twisted stick candy comprising a plurality of sizing rolls for imparting the required cross sectional shape and size to the strip of candy to be twisted, a pair of spaced apart longitudinal belts bodily rotatable transversely and between which the formed strip of candy is gripped for twisting the same between said belts and the sizing rolls, means for confining the strip of twisted candy between the belts, and means for moving the belts for conveying the strip of twisted candy to the outer ends of the belts.

5. A machine for making twisted stick candy comprising a plurality of sizing rolls for imparting the required cross sectional shape and size to the strip of candy to be twisted, a pair of spaced apart longitudinal belts between which the strip of candy passes, means for revolving said belts transversely for twisting the strip of candy between said belts and the sizing rolls, means for confining the strip of candy between the belts, and means for moving the belts for conveying the twisted candy strip to the outer ends of the belts; together with cutting mechanism receiving the twisted candy stick from the belts for severing said strip into sticks of a predetermined length.

6. A machine for making twisted stick candy comprising sizing rolls for imparting the required cross sectional shape and size to the strip of candy to be twisted, a pair of endless belts and spaced apart pairs of rollers over which said belts pass respectively with adjoining stretches of the belts spaced apart to receive the candy strip between them, means for operating said belts, and means for bodily revolving the belts laterally to twist the strip of candy intermediate said belts and the sizing rolls.

7. A machine for making twisted stick candy comprising sizing rolls for imparting the required cross sectional shape and size to the strip of candy to be twisted, a frame rotatable around an axis in line with the sizing rolls, spaced apart pairs of rollers mounted in said frame, endless belts passing over the rollers and having adjoining stretches at opposite sides of the axis of the frame and between which the formed candy strip is received for gripping and conveying said strip, and means for rotating the frame to twist the candy between the sizing rolls and belts; together with gearing responsive to the rotation of said frame for operating the belts.

8. A machine for making twisted stick candy comprising sizing rolls for imparting the required cross sectional shape and size to the strip of candy to be twisted, a frame rotatable around an axis in line with the sizing rolls, spaced apart pairs of rollers mounted on said frame, endless belts passing over the rollers and having adjoining stretches at opposite sides of the axis of the frame and between which the formed candy strip is received for gripping and conveying said strip, means for rotating the frame to twist the candy between the sizing rolls and belts, and gearing responsive to the rotation of the frame for operating the belts; together with means for cutting the strip into predetermined lengths, said cutting means receiving the twisted strip from the belts.

9. A machine for making twisted stick candy comprising sizing rolls imparting the required cross sectional shape and size to the strip of candy to be twisted, a rotatable frame consisting of spaced apart plates connected at one end to a sprocket wheel fixed to a tube forming a trunnion for said frame, a stationary tube around which the opposite end of the frame revolves, spaced apart pairs of rollers between the plates of the frame, and endless belts passing over said rollers above and below the axis of the rotatable frame, the adjoining stretches of the belts receiving the candy strip between them for gripping and conveying said strip and revolving around the axis of the frame; together with a gearwheel mounted on the stationary tube, and a train of gearing operated by said gearwheel for operating the belts by the rotation of the frame.

10. A machine for making twisted stick candy comprising sizing rolls imparting the required cross sectional shape and size to the strip of candy to be twisted, a rotatable frame consisting of spaced apart plates connected at one end to a sprocket wheel fixed to a tube forming a trunnion for said frame, a stationary tube around which the opposite end of the frame revolves, spaced apart pairs of rollers between the plates of the frame, and endless belts passing over said rollers above and below the axis of the rotatable frame, the adjoining stretches of the belts receiving the candy strip between them for gripping and conveying said strip and revolving around the axis of the frame; together with gearing for operating the belts comprising pinions in mesh with the gearwheel on the stationary tube, said pinions having shafts supported by the rotatable frame, worms on said shafts, and worm wheels connected to the rollers over which the belts pass for operating the latter.

11. A machine for making twisted stick candy comprising sizing rolls imparting the required size and shape to the candy strip to be twisted, a rotatable frame consisting of spaced apart plates connected at one end to a sprocket wheel fixed to a tube forming a trunnion for said frame, a stationary tube around which the opposite end of the frame revolves, spaced apart pairs of rollers between the plates of the frame, endless belts passing over said rollers above and below the axis of the rotatable frame, the adjoining stretches of the belts receiving the candy strip between them for gripping and conveying said strip and revolving around the axis of the frame as the belts are bodily revolved by said frame, and means yieldingly engaging the inner sides of the adjoining stretches of the belts for pressing them into contact with the formed candy strip.

12. A machine for making twisted stick candy comprising sizing rolls imparting the required size and shape to the candy strip to be twisted, a rotatable frame consisting of spaced apart plates connected at one end to a sprocket wheel fixed to a tube forming a trunnion for said frame, a stationary tube around which the opposite end of the frame revolves, spaced apart pairs of rollers between the plates of the frame, endless belts passing over said rollers above and below the axis of the rotatable frame, the adjoining stretches of the belts receiving the candy strip between them for gripping and conveying said strip and revolving around the axis of the frame as the belts are bodily revolved by said frame, and means yieldingly engaging the inner sides of the adjoining stretches of the belts comprising bars secured between the plates within the belts, and guiding members extending from the bars to engage the belts.

13. A machine for making twisted stick candy comprising sizing rolls imparting the required size and shape to the candy strip to be twisted, a rotatable frame consisting of spaced apart plates connected at one end to a sprocket wheel fixed to a tube forming a trunnion for said frame, a stationary tube around which the opposite end of the frame revolves, spaced apart pairs of rollers between the plates of the frame, endless belts passing over said rollers above and below the axis of the rotatable frame, the adjoining stretches of the belts receiving the candy strip between them for gripping and conveying said strip and revolving around the axis of the frame as the belts are bodily revolved by said frame, and means yieldingly engaging the inner sides of the adjoining stretches of the belts comprising bars secured between the plates within the belts, means for adjusting said bars toward and away from the belts, and bent metal strips secured to the bars to engage the belts.

JOSEPH M. HUTCHINSON.